Dec. 22, 1953          J. VERDERBER                2,663,598
                    PRECISION MEASURING DEVICE
Original Filed Jan. 13, 1945
                                              3 Sheets-Sheet 1
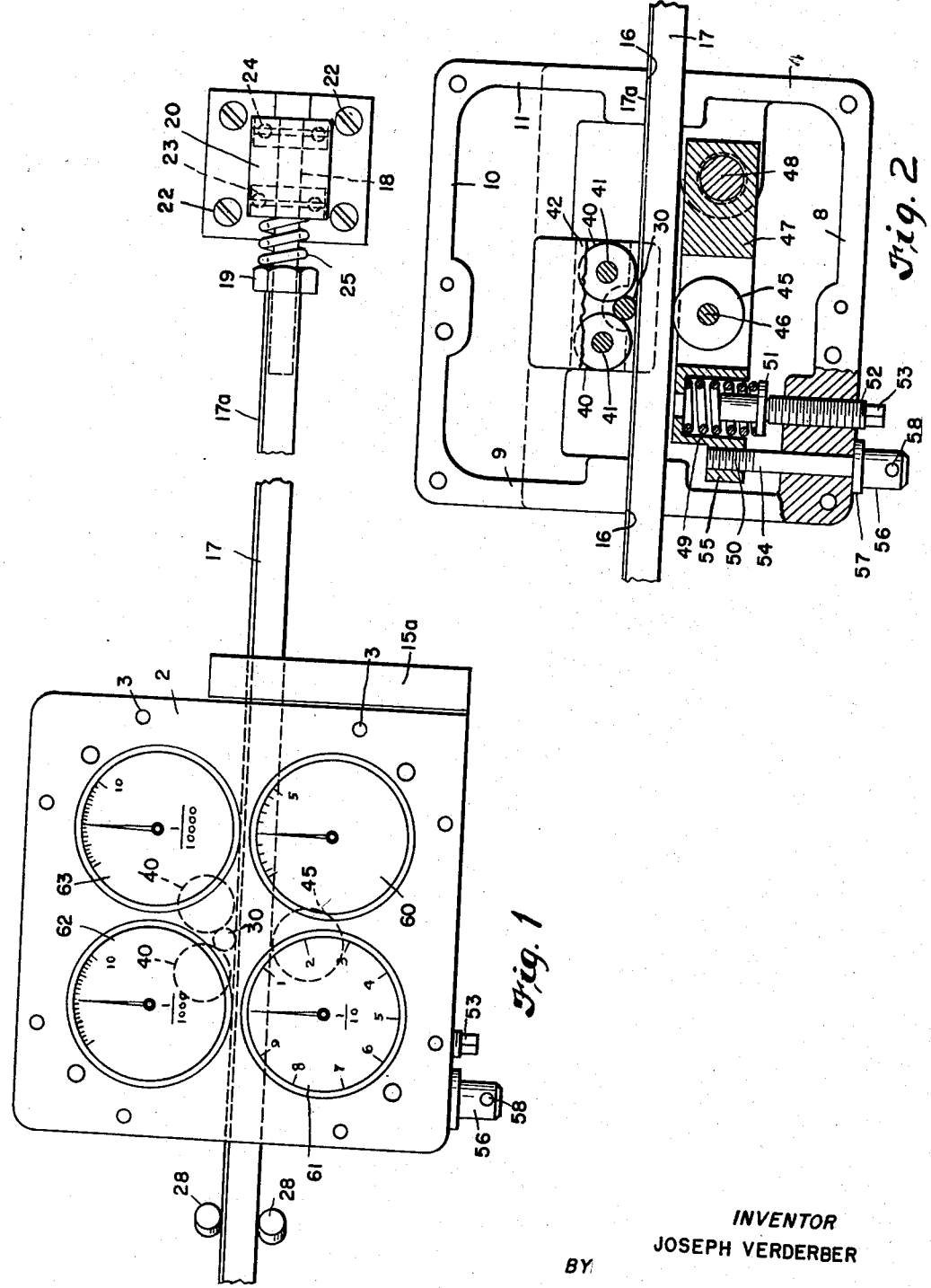
INVENTOR
JOSEPH VERDERBER
BY
         Isler and Ornster
                ATTORNEYS Dec. 22, 1953

J. VERDERBER 2,663,598

PRECISION MEASURING DEVICE

Original Filed Jan. 13, 1945

INVENTOR
JOSEPH VERDERBER

BY
John & Ornstein
ATTORNEYS

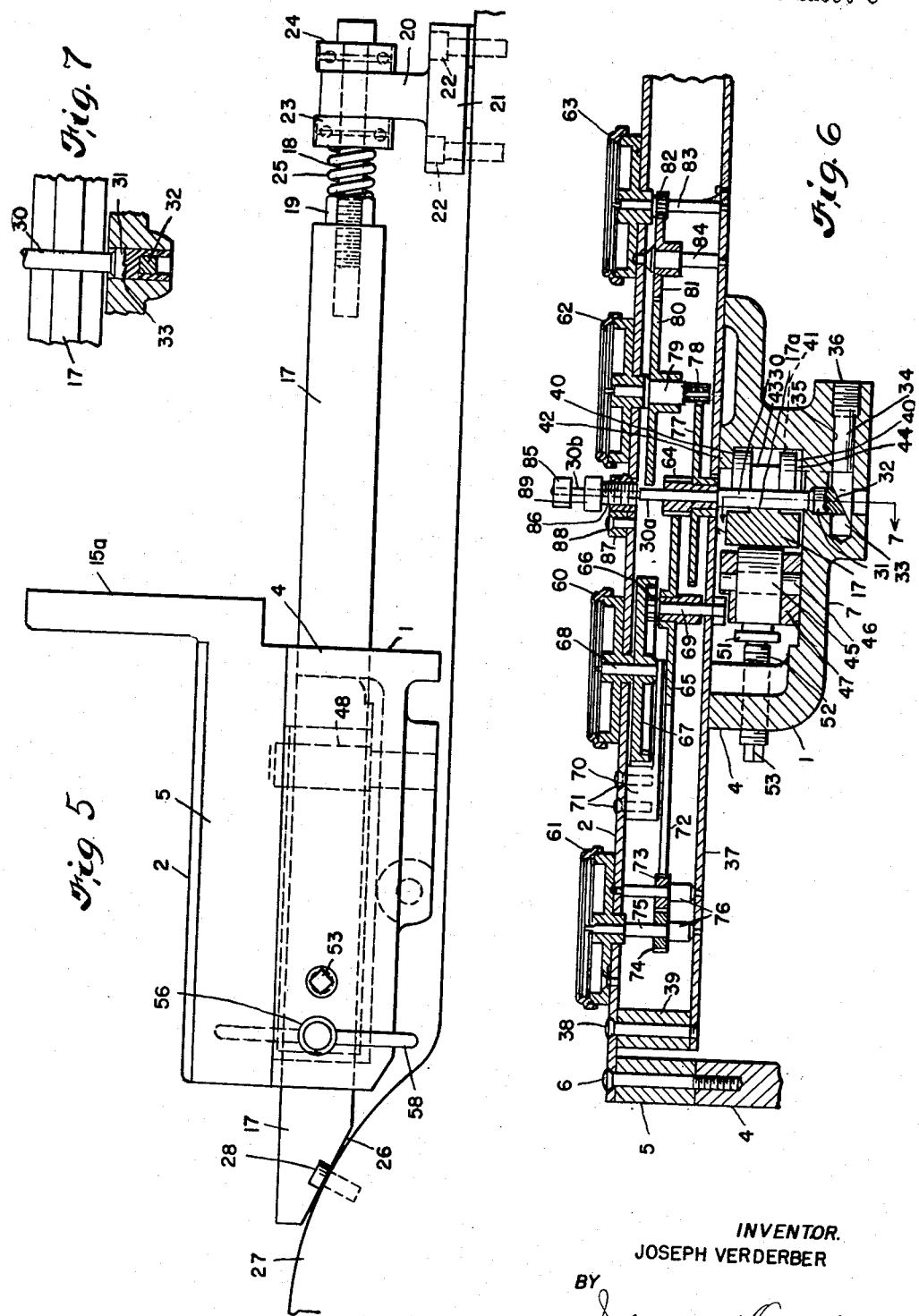

Patented Dec. 22, 1953

2,663,598

UNITED STATES PATENT OFFICE 2,663,598

PRECISION MEASURING DEVICE

Joseph Verderber, Cleveland, Ohio

Original application January 13, 1945, Serial No. 572,601. Divided and this application August 10, 1951, Serial No. 241,300

6 Claims. (Cl. 308—6)

This invention relates to measuring devices, but has reference more particularly to a precision measuring device of the type described in my U. S. Patent No. 2,350,432.

This application is a division of my copending application, Serial No. 572,601, filed January 13, 1945, now Patent No. 2,568,524.

A primary object of the invention is to provide a measuring device of the character described which affords a means of making measurements of extreme accuracy.

Another object of the invention is to provide a measuring device of the character described, which is especially adapted for use in connection with machine tools, such for example, as jig borers.

Another object of the invention is to provide a measuring device of the character described which is of simple and rugged construction, which is devoid of elements and parts which are likely to become broken or damaged, and which is compact and easily readable.

A further object of the invention is to provide a measuring device of the character described, which can be readily assembled, and the parts of which are readily accessible for repair or replacement purposes.

A further object of the invention is to provide a measuring device of the character described, which has incorporated therein means for rapidly disassociating the relatively movable elements to permit a quick return of the indicators to their zero setting.

Other objects and advantages of the invention will be apparent during the course of the following description.

In the accompanying drawings, forming a part of this specification, and in which like numerals are employed to designate like parts throughout the same:

Fig. 1 is a top plan view of the measuring device;

Fig. 2 is a view, partly in elevation and partly in section, of the measuring device, with the cover plate thereof removed;

Fig. 5 is a front elevational view of the device;

Fig. 6 is a cross-sectional view, showing in a more or less diagrammatic manner the gearing of the device, and Fig. 7 is a fragmentary cross-sectional view, taken on the line 7—7 of Fig. 6.

Figure 3:
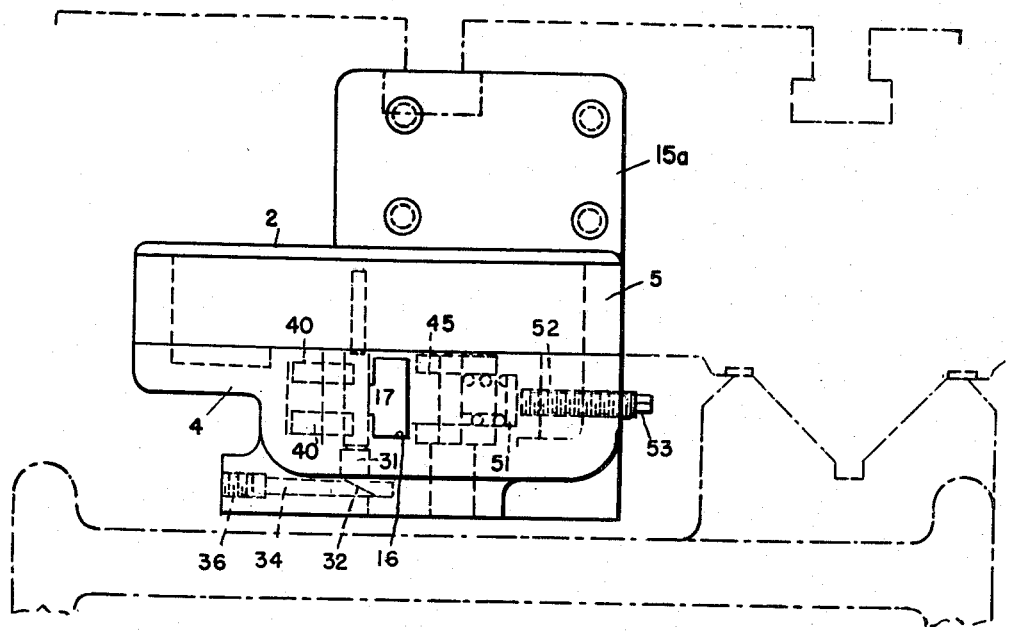
Fig. 3 is an end elevation of the device.
Figure 4:
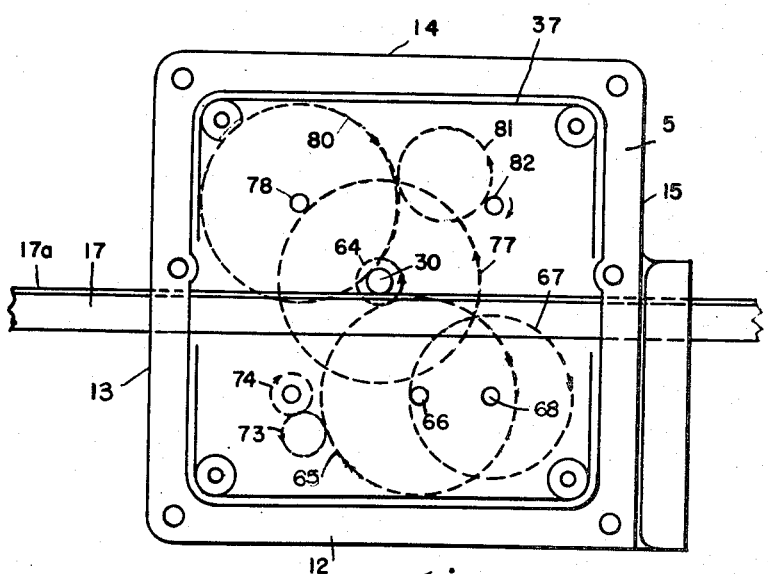
Fig. 4 is a plan view of the device, with the cover plate thereof removed, and showing the location and arrangement of the gears.

Referring more particularly to the drawings, it will be seen that the device comprises a housing or casing, generally designated by reference numeral 1, and a cover plate 2, which is removably secured to the casing, as by screws 3. The casing 1 consists of a lower portion 4, and an upper portion 5, which are removably secured together, as by screws 6.

The lower portion 4 of the casing has a bottom 7 and walls 8, 9, 10 and 11, while the upper portion 5 of the casing consists of walls 12, 13, 14 and 15. The wall 15 has formed thereon an upstanding lug or plate 15a which is adapted to be attached to the movable work table of a machine tool, such for example as a jig borer.

The walls 9 and 11 of the casing section 4 are provided with recesses 16 in which a bar 17 is mounted, such bar forming, in this case, the stationary element of the measuring device, the casing constituting the movable element of such device.

The bar 17 is of substantially rectangular cross-section and has a sliding fit in the recesses 16. Threadedly secured to one end of the bar 17 is a screw 18, which is locked to the bar by means of a locknut 19, the shank of the screw extending through an upstanding lug or ear 20 of a pedestal member 21, which is rigidly secured, as by means of screws 22, to the bed of the machine tool, which, as hereinabove stated, may be a jig borer. Pinned to the screw 18, at opposite sides of the ear 20, are thrust bearings 23 and 24. A coil spring 25 is interposed between the locknut 19 and the thrust bearing 23, and serves to insure proper alignment of the bar 17 with the casing, as well as to absorb shock.

The opposite end of the bar 17 is beveled as at 26, so that this end of the bar may abut a correspondingly inclined surface 27 of the bed plate of the machine tool, the surfaces 26 and 27 cooperating to maintain the bar against longitudinal movement. Pins 28 are secured to the bed plate of the machine tool, and serve as a guide for one end of the bar.

The bar 17 is provided at one side thereof with a rib 17a, which bears against a spindle 30, which extends vertically through the portion 4 of the housing, and is supported upon a thrust pin 31, which is slidably mounted in the bottom 7 of the casing section 4. The pin 31 is slotted in its lower end to provide an inclined surface 32 which is engaged by a correspondingly inclined surface 33 on one end of a pin 34, which is disposed in a recess or opening 35 in the bottom 7 of the casing section 4, and is maintained in engagement with the pin 31 by means of a screw 36, the function of which will be presently described.

The spindle 30 has an intermediate reduced portion 30a which extends through a partition and bearing plate 37, which is secured in spaced relation to the cover plate 2 by means of screws 38 and spacers 39. The spindle 30, in turn, bears against two pairs of rollers 40, which are mounted on vertically-extending shafts 41, mounted within the casing section 4 between the bottom 7 thereof and a ledge 42 of the housing section which is paralled with the bottom thereof. The rollers of each pair of rollers are maintained in vertically-spaced relation by means of spacer members 43, and thrust bearing washers 44 are interposed between the lower rollers of each pair and the bottom of the housing section.

The bar 17 is maintained in rolling contact with the spindle 30 by means of a roller 45, which is mounted on a vertically-extending shaft 46, the ends of which are mounted in a roller carriage 47. The roller carriage 47 is pivotally secured within the housing section 4 by means of a pin 48, and the roller 45 is resiliently maintained in engagement with the bar 17 by means of a coil expansion spring 49, which is seated in a recess 50 in the carriage, one end of the spring bearing against the carriage and the other end against a thrust element 51. The thrust element bears against a set screw 52, which is mounted in the wall 8 of the housing section 4, and has a squared end 53 for engagement by a socket wrench when the screw is to be adjusted for varying the compression of the spring 49.

It is desirable, at times, to release the roller 45 from engagement with the bar 17, and for this purpose, a screw 54 is provided which is mounted for reciprocal movement in the wall 8 of the housing section 4, and has its inner end in threaded engagement with an ear 55 on the carriage 47. The screw has a head 56 which is disposed exteriorly of the wall 8, a thrust bearing washer 57 being interposed between said wall and head. To facilitate turning of the screw 54, when the roller 45 is to be withdrawn from the bar 17, a lever 58 is secured to and extends at right angles from the head 56 of the screw to form a handle.

The screw 54 is so connected to the carriage 47, that when the lever 58 is in the solid line position shown in Fig. 5, the roller 45 bears with the proper degree of pressure against the bar 17, and when the lever is in the dotted line position, the pressure of the roller is sufficiently relieved to permit free movement of the housing relatively to the bar.

The movement of the housing 1 relatively to the bar 17 is transmitted through the roller 45 and spindle 30 to pointers which are associated with a set of dials which are disposed above and secured to the cover plate 2. These dials are designated by reference characters 60, 61, 62 and 63, the dial 60 bearing indicia marks indicating inches, the dial 61 tenths of an inch, the dial 62 thousandths of an inch, and the dial 63 ten-thousandths of an inch.

The aforesaid movement is transmitted to the various pointers in the following manner as will be apparent from Fig. 6 of the drawings.

The movement to the pointer associated with the dial 60 is transmitted through the intermediary of the reduced portion 30a of the spindle 30, a pinion 64, a gear 65, a pinion 66, an internal gear 67, and a spindle 68. The pinion 64 is splined or otherwise rigidly secured to the reduced portion of the spindle 30. The gear 65 is rigidly secured to the pinion 66, and the latter is revolubly mounted on a spindle 69 which is secured to the plate 37. The spindle 68 is supported by means of a bracket 70, which is secured to the cover plate 2 by means of screws 71.

The aforesaid movement to the pointer associated with the dial 61 is transmitted through the intermediary of the reduced portion 30a of the spindle 30, the pinion 64, the gear 65, a gear 72, pinions 73 and 74, and a spindle 75. The pinion 73 is revolubly mounted on a spindle 76, the ends of which are secured in the plates 2 and 37. The pinion 74 is rigidly secured to the spindle 75, the ends of which are journalled in the dial 61 and the plate 37.

The aforesaid movement to the pointer associated with the dial 62 is transmitted through the intermediary of the reduced portion 30a of the spindle 30, the pinion 64, a gear 77, a pinion 78, and a spindle 79, the ends of which are journalled in the dial 62 and the plate 37.

The aforesaid movement to the pointer associated with the dial 63 is transmitted through the intermediary of the reduced portion 30a of the spindle 30, the pinion 64, the gear 77, the pinion 78, a gear 80 which is rigidly secured to the spindle 79, a gear 81, a pinion 82 and a spindle 83. The gear 81 is mounted on a spindle 84, the ends of which are journalled in the plates 2 and 37. The ends of the spindle 83 are journalled in the dial 63 and plate 37.

For the purpose of returning the pointers which are associated with the various dials to their zero positions, a knurled knob 85 is secured to the upper reduced end portion 30b of the spindle 30, and when the pointers are to be returned to their zero positions, the roller 45 is first withdrawn from engagement with the bar 17 in the manner previously described, thereby relieving the pressure between the bar 17 and spindle 30 and facilitating turning of the spindle.

The spindle 30 bears at its lower end upon the thrust pin 31, and at the upper end of the reduced portion 30a thereof, it bears against a thrust screw 86, which is adjustably mounted in a holder element 87, which is secured as by a screw 88 to the cover plate 2. The screw 86 is provided with a knurled head 89 to facilitate rotation thereof. The screw 86 has an axial opening therein through which the reduced portion 30b of the spindle 30 extends.

By adjustment of the screw 86 and the screw 86, the vertical position of the spindle 30 may be accurately set, and a desired degree of pressure on the ends of the spindle provided, to insure free rotation of the spindle.

The pin 30 preferably has a slight taper, and the surface 17a of the bar 17 is transversely inclined to correspond with this taper. This permits an accurate adjustment of the frictional pressure between the pin 30 and the bar 17 to be made, and insures contact between the pin and bar at such time that these are in operative engagement with each other.

The various parts of the device are machined in such a manner as to obtain the highest degree of accuracy. Anti-friction bearings are provided wherever necessary to insure frictionless rotation of the various pins, shafts and other elements.

The use and operation of the device will be readily understood from the foregoing description, but may be briefly described as follows:

With the bar 17 attached to the bed plate or other relatively stationary part of the machine tool, as for example, a vertical jig borer, and the housing attached to the movable work table of the machine tool, the work table is moved to any desired setting which may be easily and quickly read on the dials of the device, thereby locating the work on such table with extreme accuracy relatively to the tool.

While the bar 17 has been described as stationary and the housing as movable, it will be readily understood that these relatively movable elements may be used in reversed relation, that is to say, the housing may be attached to the bed plate of the machine and the bar 17 to the movable work table.

It will be further understood that the use of the device is not necessarily confined to machine tools and the like, but that the device is readily adapted for use wherever accuracy of measurement between two relatively movable parts is desired.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a device of the character described, a housing, a bar movable through said housing, a roller in engagement with one side of said bar, means resiliently urging said roller into engagement with said bar, and manually-controlled means independent of said first-named means for retracting said roller from said bar, whereby to relieve the pressure of said roller against said bar, and permit free relative movement between the bar and housing.

2. In a device of the character described, a housing, a bar movable through said housing, a roller in said housing, means resiliently pressing said roller into engagement with said bar, means for varying the intensity of said pressure, and means independent of said first-named means for retracting said roller from said bar.

3. In a device of the character described, a housing, a bar movable through said housing, a roller in said housing, means resiliently pressing said roller into engagement with said bar, means for varying the intensity of said pressure, and manually-controlled screw means independent of said first-named means for retracting said roller from said bar.

4. In a device of the character described, a housing, a bar movable through said housing, a carriage pivotally mounted in said housing, a roller journalled in said carriage, means bearing on said carriage and resiliently urging said roller into engagement with said bar, and means accessible from the exterior of said housing for varying the pressure exerted by said first-named means.

5. In a device of the character described, a housing, a bar movable through said housing, a carriage pivotally mounted in said housing, a roller journalled in said carriage, spring means for resiliently urging said roller against said bar, means for adjusting the tension of said spring means, and manually-controlled means independent of said adjusting means for retracting said carriage to withdraw said roller from engagement with said bar.

6. In a device of the character described, a housing, a bar movable through said housing, a carriage pivotally mounted in said housing, a roller journalled in said carriage and bearing on said bar, spring means bearing against said carriage for resiliently urging said roller against said bar, means for adjusting the tension of said spring means, said adjusting means including a screw mounted in the wall of the housing and extending to a point exteriorly of the housing whereby it may be rotated from a point exteriorly of the housing, and means independent of said adjusting means secured to said carriage and extending to a point exteriorly of the housing for withdrawing said roller from engagement with said bar.

JOSEPH VERDERBER.

References Cited in the file of this patent

UNITED STATES PATENTS

| Number | Name | Date |
|---|---|---|
| 637,016 | Oram | Nov. 14, 1899 |
| 1,420,612 | Vanderveld | June 20, 1922 |
| 2,229,629 | Anderson | Jan. 28, 1941 |
| 2,350,432 | Verderber | June 6, 1944 |
| 2,378,212 | Giern et al. | June 12, 1945 |